United States Patent
Hildebrandt

(10) Patent No.: US 7,415,599 B1
(45) Date of Patent: Aug. 19, 2008

(54) INSTRUCTION OPERATION AND OPERAND MEMORY LOCATION DETERMINED BASED ON PRECEDING INSTRUCTION OPERATION AND OPERAND MEMORY LOCATION

(75) Inventor: Thomas Henry Hildebrandt, Mercer Island, WA (US)

(73) Assignee: ZiLOG, Inc., San Jose, CA (US)

( * ) Notice: Subject to any disclaimer, the term of this patent is extended or adjusted under 35 U.S.C. 154(b) by 247 days.

(21) Appl. No.: 11/265,421

(22) Filed: Nov. 1, 2005

(51) Int. Cl.
*G06F 9/318* (2006.01)

(52) U.S. Cl. ...................................... 712/226; 712/209
(58) Field of Classification Search .................. None
See application file for complete search history.

(56) References Cited

U.S. PATENT DOCUMENTS

| | | | | |
|---|---|---|---|---|
| 3,736,567 | A * | 5/1973 | Lotan et al. ................... | 712/231 |
| 4,236,206 | A | 11/1980 | Strecker et al. | |
| 4,958,275 | A * | 9/1990 | Yokouchi ..................... | 712/225 |
| 5,226,129 | A | 7/1993 | Ooi et al. | |
| 5,452,427 | A | 9/1995 | Tobita et al. | |
| 5,940,876 | A * | 8/1999 | Pickett ........................ | 711/220 |
| 6,247,125 | B1 * | 6/2001 | Noel-Baron et al. ......... | 712/241 |
| 6,282,633 | B1 * | 8/2001 | Killian et al. ................ | 712/208 |
| 6,990,570 | B2 * | 1/2006 | Masse et al. ................. | 712/241 |

FOREIGN PATENT DOCUMENTS

JP H05-12005 A * 5/1993

OTHER PUBLICATIONS

Hardware Manual, Hitachi Single-Chip Microcomputer, H8/3664 Series, ADE-602-202C, Revision 4.0, Mar. 20, 2002.

* cited by examiner

*Primary Examiner*—Kenneth S Kim
(74) *Attorney, Agent, or Firm*—Imperium Patent Works; T. Lester Wallace; Darien K. Wallace

(57) ABSTRACT

A repeat instruction (RPT) operates on one or more operands, but the RPT instruction includes only an opcode and does not specify locations of the operand or operands. The type of operation to be performed when the RPT instruction is executed depends upon an initial instruction. If, for example, the initial instruction is an ADD, then the RPT instruction causes an ADC operation to be performed, thereby facilitating efficient coding of an extended precision addition operation. The locations of the operands for the RPT instruction are assumed to be in predetermined memory locations. When coding a repeated operation, rather than following the initial instruction with one or more instructions of the same form, the initial instruction is followed by one or more of the shorter RPT instructions, thereby conserving memory space and facilitating backward compatibility with an instruction set that does not have the RPT instruction.

25 Claims, 6 Drawing Sheets

| OPERATION | INITIAL INSTRUCTION | NEXT INSTRUCTION | OPERAND ADDRESS UPDATE (BIG ENDIAN) | OPERAND ADDRESS UPDATE (LITTLE ENDIAN) |
|---|---|---|---|---|
| ADDITION | ADD | ADC | - -, - - | + +, + + |
| SUBTRACTION | SUB | SBC | - -, - - | + +, + + |
| COMPARISON | CP | CPC | - -, - - | + +, + + |
| SHIFT LEFT | SHL | RLC | - - | + + |
| ROTATE CARRY INTO LSB | RLC | RLC | - - | + + |
| INCREMENT | INC | INC if Z' else NOP | - - | + + |
| DECREMENT | DEC | DEC if Z else NOP | - - | + + |
| SHIFT RIGHT LOGICAL | SRL | RRC | + + | - - |
| SHIFT RIGHT ARITHMETIC | SRA | RRC | + + | - - |
| ROTATE CARRY INTO MSB | RRC | RRC | + + | - - |
| MOVE | LD | LD | + +, + + OR - -, - - | - -, - - OR + +, + + |
| BITWISE AND | AND | AND | + +, + + OR - -, - - | - -, - - OR + +, + + |
| BITWISE OR | OR | OR | + +, + + OR - -, - - | - -, - - OR + +, + + |
| BITWISE XOR | XOR | XOR | + +, + + OR - -, - - | - -, - - OR + +, + + |
| CLEAR | CLR | CLR | + + OR - - | - - OR + + |
| ONES COMPLEMENT | COM | COM | + + OR - - | - - OR + + |
| PUSH | PUSH | PUSH | - - OR + +  (a) | + + OR - - |
| POP | POP | POP | + + OR - -  (b) | - - OR + + |

(a) = DEPENDS ON WHAT DIRECTION THE STACK GROWS.
(b) = OPPOSITE OF PUSH.

NEXT INSTRUCTION OPERATION AND OPERAND ADDRESS UPDATES
PERFORMED BY THE REPEAT (RPT) INSTRUCTION

| HEXIDECIMAL ENCODING | | MNEMONIC | OPERANDS |
|---|---|---|---|
| 02 | 37 | ADD | R3,R7 |
| 12 | 26 | ADC | R2,R6 |
| 12 | 15 | ADC | R1,R5 |
| 12 | 04 | ADC | R0,R4 |

TOTAL BYTES USED = 8

32-BIT ADD - PROGRAM MEMORY

| OPERATION | INITIAL INSTRUCTION | NEXT INSTRUCTION | OPERAND ADDRESS UPDATE (BIG ENDIAN) | OPERAND ADDRESS UPDATE (LITTLE ENDIAN) |
|---|---|---|---|---|
| ADDITION | ADD | ADC | - -, - - | + +, + + |
| SUBTRACTION | SUB | SBC | - -, - - | + +, + + |
| COMPARISON | CP | CPC | - -, - - | + +, + + |
| SHIFT LEFT | SHL | RLC | - - | + + |
| ROTATE CARRY INTO LSB | RLC | RLC | - - | + + |
| INCREMENT | INC | INC if Z' else NOP | - - | + + |
| DECREMENT | DEC | DEC if Z else NOP | - - | + + |
| SHIFT RIGHT LOGICAL | SRL | RRC | + + | - - |
| SHIFT RIGHT ARITHMETIC | SRA | RRC | + + | - - |
| ROTATE CARRY INTO MSB | RRC | RRC | + + | - - |
| MOVE | LD | LD | + +, + + OR - -, - - | - -, - - OR + +, + + |
| BITWISE AND | AND | AND | + +, + + OR - -, - - | - -, - - OR + +, + + |
| BITWISE OR | OR | OR | + +, + + OR - -, - - | - -, - - OR + +, + + |
| BITWISE XOR | XOR | XOR | + +, + + OR - -, - - | - -, - - OR + +, + + |
| CLEAR | CLR | CLR | + + OR - - | - - OR + + |
| ONES COMPLEMENT | COM | COM | + + OR - - | - - OR + + |
| PUSH | PUSH | PUSH | - - OR + + (a) | + + OR - - |
| POP | POP | POP | + + OR - - (b) | - - OR + + |

(a) = DEPENDS ON WHAT DIRECTION THE STACK GROWS.
(b) = OPPOSITE OF PUSH.

NEXT INSTRUCTION OPERATION AND OPERAND ADDRESS UPDATES
PERFORMED BY THE REPEAT (RPT) INSTRUCTION

FIG. 3

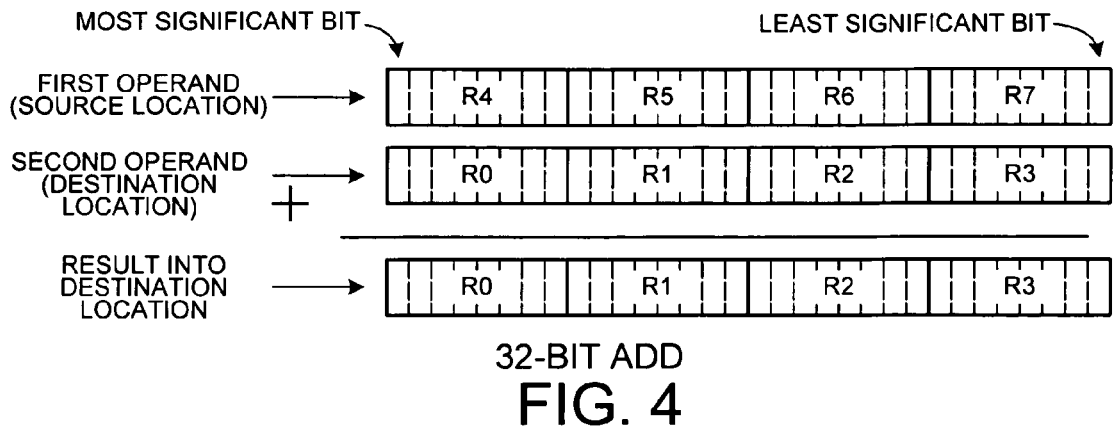
32-BIT ADD
FIG. 4
| | HEXADECIMAL ENCODING | MNEMONIC | OPERANDS | RESULT |
|---|---|---|---|---|
| TOTAL BYTES USED = 5 | 02  37 | ADD | R7,R3 | R3 |
| | F3 | RPT | R6,R2 | R2 |
| | F3 | RPT | R5,R1 | R1 |
| | F3 | RPT | R4,R0 | R0 |
32-BIT ADD - PROGRAM MEMORY
FIG. 5
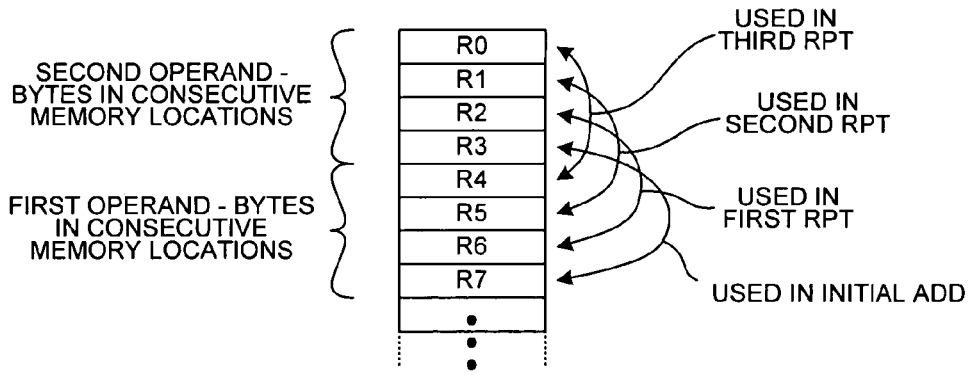
32-BIT ADD - DATA MEMORY
FIG. 6
```
        LD    R0, #15       ; 2 BYTES
        LDX   D00H, B00H    ; 5 BYTES
LOOP:   RPT                 ; 1 BYTES
        DJNZ  R0, LOOP      ; 2 BYTES
```
FIG. 7

PROCESSOR ARCHITECTURE

| HEXADECIMAL ENCODING | MNEMONIC | OPERANDS |
|---|---|---|
| 02  37 | ADD | R7,R3 |
| F4 | RPT3 | |

TOTAL BYTES USED = 3

**32-BIT ADD
(ANOTHER EMBODIMENT)**

FIG. 10

| HEXADECIMAL ENCODING | MNEMONIC | OPERANDS | COMMENTS |
|---|---|---|---|
| 06  27  E8 | ADD | 27H , #E8 | |
| F4  03 | RPT | #03 | EXECUTES ADC 26H , #03 |

**CODE TO ADD 1000 (DECIMAL) TO THE 16-BIT
VALUE IN LOCATIONS 26H AND 27H**

FIG. 11

INSTRUCTION OPERATION AND OPERAND MEMORY LOCATION DETERMINED BASED ON PRECEDING INSTRUCTION OPERATION AND OPERAND MEMORY LOCATION

TECHNICAL FIELD

The present invention relates to processor architectures and instructions that reduce the amount of program memory utilized when wide data values are to be operated on by a processor that has a narrower ALU and/or data bus.

BACKGROUND

FIG. 1 (Prior Art) is a simplified diagram of a portion of a commercially available 8-bit microcontroller integrated circuit. The microcontroller integrated circuit includes an amount of program memory 1, a processor portion 2, and an amount of data memory 3. Processor portion 2 includes a program counter 4, a fetch unit 5, an instruction buffer 6, an execution unit 7, and an 8-bit arithmetic logic unit (ALU) 8. ALU 8 receives two 8-bit operand values, performs an arithmetic or logic operation on the two 8-bit operand values, and outputs an 8-bit result. The first operand may be called the destination operand. The second operand may be called the source operand. An example of such an 8-bit operation is the addition of two 8-bit values.

In addition to being able to perform 8-bit operations, it is also often desired to perform arithmetic and logic operations on values having more than 8-bits of precision. FIG. 2 (Prior Art) is a diagram that illustrates four instructions that might be executed by the microcontroller of FIG. 1 in order to perform a 32-bit ADD operation. The instructions of FIG. 2 are stored in consecutive 8-bit memory locations in program memory. The first instruction occupies two 8-bit memory locations (two bytes) in program memory. The first byte stores the equivalent of a hexadecimal "02". The second byte stores the equivalent of a hexadecimal "37". It is therefore seen that the four instructions of FIG. 1 occupy a total of eight bytes of program memory.

To perform the 32-bit ADD operation in this example, fetch unit 5 fetches the first byte (02) of the first instruction (the ADD instruction) out of program memory 1, across the eight-bit data bus 9, and into the FetchData inputs of fetch unit 5. Fetch unit 5 latches the first byte into the Opcode portion 10 of the instruction buffer 6. This byte is then used to determine the number of additional bytes that may need to be fetched in order to complete the fetching of the instruction. Depending on the type of instruction, there may be from zero up to three more bytes that need to be fetched in order to complete fetching the instruction. Fetch unit 5 fetches these bytes and places them into the portions of instruction buffer 6 labeled P1, P2 and P3. The number of subsequent bytes depends on the opcode.

In the present example, the first byte of the first instruction indicates that the instruction is the ADD instruction (add instruction where the carry-in is ignored). The next byte (37) fetched by fetch unit 5 is therefore loaded into P1. When the second byte is present in P1, then fetch unit 5 sends a signal VALID to execution unit 7 indicating that the complete instruction is present in instruction buffer 6. Execution unit 7 supplies operands as indicated by the opcode to ALU 8. In the present example of an ADD instruction, the first nibble of the second byte is a "3". This indicates that the content of register 3 (R3) in data memory 3 is to be read out of data memory 3 by execution unit 7 and is to be supplied as DOUT[0:7] to ALU 8. The "D" in DOUT indicates the "destination" operand. The second nibble of the second byte is a "7". This indicates that the content of register 7 (R7) in data memory 3 is to be read out of data memory 3 by execution unit 7 and is to be supplied as SOUT[0:7] to ALU 8. The "S" in SOUT indicates the "source" operand. ALU 8 outputs the sum of the two operand values onto the 8-bit output of ALU 8 as ALUOUT[0:7]. This output is then written back into the destination operand's address DIN in data memory 3. The content of R3 is therefore overwritten with the result of the 8-bit addition. A carry bit value remains in ALU 8.

In similar fashion, fetch unit 5 fetches the next byte out of the program memory and places it into the opcode portion 10 of instruction buffer 6. As seen from FIG. 2, the instruction is an ADC instruction (add with carry). Fetch unit 5 therefore reads the next byte (26) out of program memory and places that byte into P1. Because the first nibble of the second byte is a "2", execution unit 7 reads the content of R2 out of data memory 3 and supplies that value to ALU 8 as the first operand on DIN[0:7]. Because the second nibble of the second byte is a "6", execution unit 7 reads the content of R6 out of data memory 3 and supplies that value to ALU 8 as the second operand on SOUT[0:7]. The instruction is an ADD with carry (ADC), so the carry bit value from the previous instruction that was stored in the ALU 8 is used as a carry in value for the second instruction. ALU 8 outputs the resulting 8-bit sum onto ALUOUT[0:7]. The carry bit out is stored in ALU 8 as before. The 8-bit sum is written back into the destination operand's address DIN in data memory 3. The content of R2 is therefore overwritten.

In similar fashion, the third ADC (add with carry) instruction and the fourth ADC (add with carry instruction) instruction are performed. At the end of execution of the fourth instruction, the 32-bit result of the 32-bit add operation is present in registers R3, R2, R1 and R0. The first 32-bit value added is the 32-bit value in registers R7, R6, R5 and R4. The second 32-bit value added is the 32-bit value that was originally present in registers R3, R2, R1 and R0. The carry out value for the 32-bit add operation is present in ALU 8. This carry out value is also made available to the execution unit 7 in a status register (not shown).

In the 32-bit add example of FIG. 1, notice that eight bytes of program memory are consumed to store the instructions necessary to perform the 32-bit operation using the 8-bit ALU. In processors where execution speed on such larger 32-bit values is more important and reducing the cost of the processor is less important, wider ALUs and wider data buses are typically employed. Where processing speed of such 32-bit values is less important but where reducing the cost of the processor is more important, then typically narrower ALUs and a narrower data buses are employed. When a narrower ALU and data bus are employed, however, a large amount of program memory is consumed due to the need to store multiple 8-bit instructions in order to perform a single larger 32-bit instruction. Where cost of the overall microcontroller implementation is critical, it would be desirable to be able to reduce the amount of program memory consumed without providing a wider ALU and data bus. If the amount of program memory required to perform a given program could be reduced, then either more program functionality could be provided into a microcontroller design having the same amount of program memory (thereby increasing functionality of the implementation) or the amount of program memory provided could be reduced (thereby reducing the cost of the implementation).

In addition to the above considerations, certain instruction sets and processor architectures have been well accepted over the years. It is desired to be able to use the experience and familiarity with these instruction sets and processors in the designs of subsequent products. A large body of software has been written for such well-accepted processors, and it is desired to maintain as much backward compatibility with the previous software and instruction sets as possible. It is not, therefore, desirable to generate a new instruction set from scratch. A solution is therefore desired that reduces the amount of program memory necessary to perform large arithmetic and logic operations in a processor having a narrower ALU and data bus, and it is desired to do this in a way that maintains a substantial degree of backward compatibility with an existing well-accepted instruction set and processor design.

SUMMARY

A novel repeat instruction (RPT) operates on one or more operands, but the RPT instruction includes only an opcode and does not specify locations of the operand or operands. The type of operation to be performed when the RPT instruction is executed is dependent upon an initial instruction that precedes the RPT instruction. If, for example, the initial instruction is an addition (ADD) instruction, then a following RPT instruction causes an addition with carry (ADC) operation to be performed, thereby facilitating an extended precision addition operation. The carry-in value needed for execution of the addition with carry operation was determined by execution of the initial instruction. Accordingly, execution of the initial instruction determines the first portion of the extended precision addition result, whereas execution of the RPT instruction determines the second and subsequent portions of the extended precision addition result.

If, for example, the initial instruction is a load (LD) instruction, then a following RPT instruction causes another LD operation to be performed, thereby facilitating an efficient move of a block of information from one location to another location. Execution of the initial instruction moves the first portion of the information to be moved, whereas execution of the RPT instruction causes a move of the second and subsequent portions of the information.

If, for example, the initial instruction is an increment (INC) instruction, then a following RPT instruction causes another increment INC operation to be performed if the operand incremented by the prior initial instruction rolled over to "00000000", thereby facilitating an extended precision increment operation. Whether execution of the prior instruction caused the operand to roll over to "00000000" is determined by the prior instruction and this information is used in execution of the RPT instruction. Execution of the initial instruction determines the first portion of the extended precision increment result, whereas execution of the RPT instruction determines the second and subsequent portions of the extended precision increment result.

When coding an extended precision operation, rather than following the initial instruction with another instruction of the same form, the initial instruction is followed by the shorter RPT instruction, thereby conserving program memory space. The locations of the operands for the RPT instruction are assumed to be in predetermined memory locations that are adjacent to corresponding operands of the prior instruction. Because the locations of the operands are not explicitly stated in the RPT instruction, the amount of program memory consumed by the overall program that performs the repeated operation is reduced.

Techniques are described below for adding the RPT instruction capability to an existing processor architecture. The RPT instruction allows the size of executable code generated by a C compiler to be reduced in comparison with a prior instruction set. The RPT instruction may, for example, be added to a microcontroller instruction set without having to make major architectural changes to the architecture of the microcontroller. A processor that executes the novel RPT instruction is set forth. Multiple variants of the novel RPT instruction are set forth. Other embodiments and advantages and considerations are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 3 is a table that illustrates the next instruction executed when a novel repeat (RPT) instruction is executed following an initial instruction. The initial instruction determines what kind of operation the RPT instruction will perform. The initial and next instruction pairs of Table 3 are merely illustrative. Other initial and next instruction pairs can be added in accordance with teachings in this patent document.

FIG. 4 is an illustration of a 32-bit addition operation.

FIG. 5 is an illustration of an initial ADD instruction followed by three of the novel repeat (RPT) instructions that cause the 32-bit addition operation of FIG. 4 to be performed.

FIG. 6 is an illustration of where the operands for the 32-bit addition operation of FIG. 4 are located in memory, and where the 32-bit result is stored in memory.

FIG. 7 is an illustration of an example where the one-byte RPT instruction is executed in a tight loop, thereby repeatedly performing a load with autoincrement operation.

FIG. 10 is a diagram of another embodiment of the novel repeat (RPT) instruction where a 32-bit addition operation is performed by executing an initial ADD instruction and a single following novel RPT3 instruction.

FIG. 11 is another embodiment of the novel repeat instruction wherein only some of the operands of the next instruction to be executed upon reading the RPT instruction are predetermined.

DETAILED DESCRIPTION

Figures 1, 2:
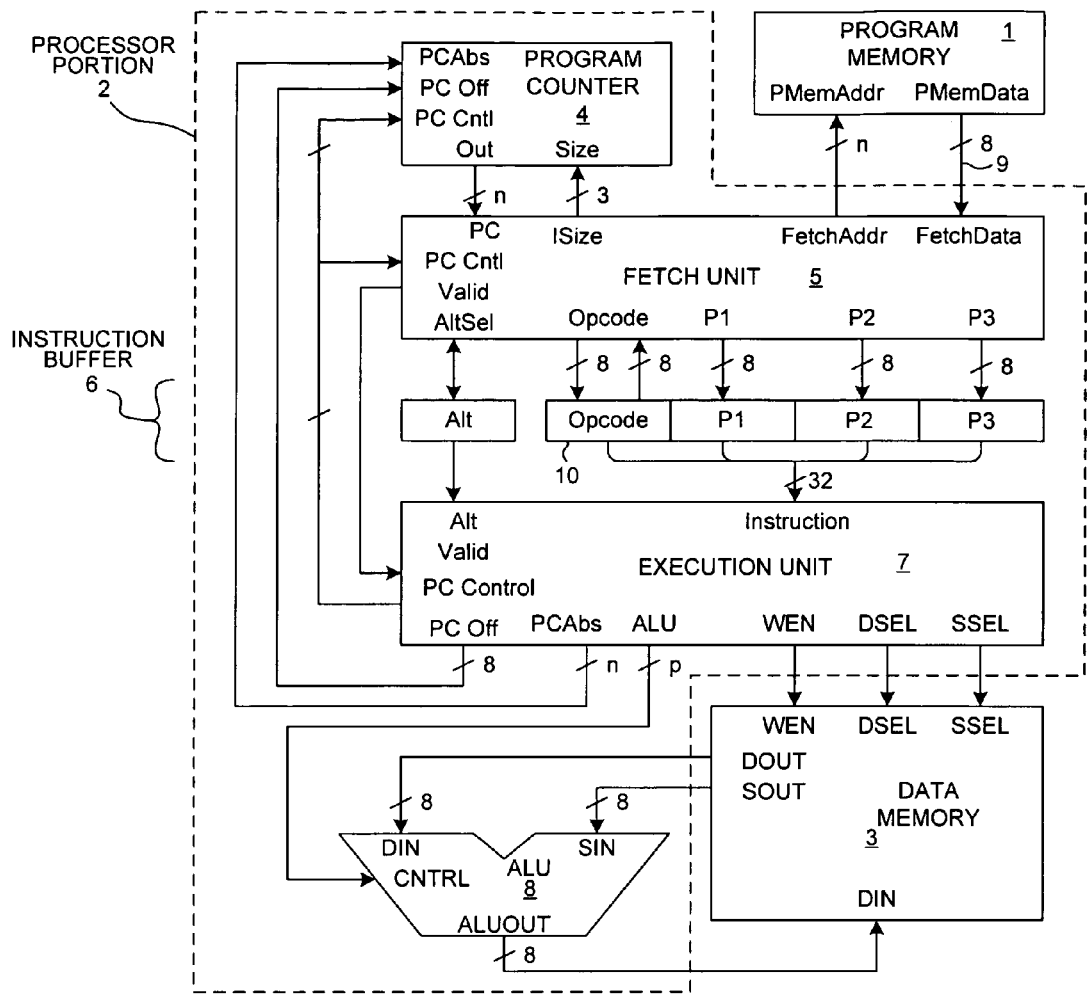
FIG. 1 (Prior Art) is a simplified diagram of a portion of a commercially available eight-bit microcontroller integrated circuit.
FIG. 2 (Prior Art) is a diagram that illustrates four instructions executed by the microcontroller of FIG. 1 in order to perform a 32-bit addition operation.

Reference will now be made in detail to some embodiments of the invention, examples of which are illustrated in the accompanying drawings.

FIG. 3 is a table that sets forth operations performed when a novel repeat (RPT) instruction is executed. The opcode mnemonics (like ADD) are opcode mnemonics for the Zilog Z8 Encore! instruction set. The opcode for the novel RPT instruction is F3. When a processor encounters the RPT instruction, it performs an operation as defined by the table of FIG. 3. The first row of the table indicates that when the instruction before the RPT instruction (the "initial" instruction) was an add instruction (ADD), then the "next" instruction performed as a result of the RPT instruction is an add-with-carry (ADC) instruction. The RPT instruction is a one-byte instruction that does not involve an explicit statement of the addresses of two operands to be used when the operation of the RPT instruction is carried out.

Rather than explicitly setting forth the two addresses of the operands, the addresses are predefined to be the values found in particular data memory locations. When the initial instruction has two operands, the address for the first operand of the next instruction is the address that neighbors the address where the first operand of the initial instruction was found. In the table of FIG. 3, the first "--" in the "--,--" in the fourth column indicates that the address where the first operand for the initial instruction is found is decremented by one to find the address where the first operand for the next instruction (the RPT instruction) is to be found. Similarly, when the initial instruction has two operands, the address for the second operand of the next instruction (the RPT instruction) is the address that neighbors the address where the second operand of the initial instruction was found. In the table of FIG. 3, the second "--" in the "--,--" in the fourth column indicates that the address where the second operand of the initial instruction is found is decremented by one to find the address where the second operand of the next instruction is to be found.

FIG. 4 is a diagram of a 32-bit addition operation that illustrates operation of the novel RPT instruction. Two 32-bit numbers are to be added. The first 32-bit number is the upper number. It is designated the first operand of the "source" operand. It consists of four eight-bit values R7, R6, R5 and R4 that are logically concatenated together to form a single 32-bit number. As illustrated in FIG. 4, the rightmost bit of R7 is the least significant bit of the first 32-bit number. The leftmost bit of R4 is the most significant bit of the first 32-bit number.

The "R" stands for "register". The term "register" here is another name for a storage or memory location. The contents of a memory location are sometimes referred to by the name of the register that contains the contents. "R7", for example, designates both the memory location "R7" as well as the current contents of the memory location "R7".

The second 32-bit number involved in the 32-bit addition operation is the lower number that is above the addition line in the illustration of FIG. 4. It is designated the second operand or the "destination" operand. This number consists of four eight-bit values R3, R2, R1 and R0 that are logically concatenated together to form a single 32-bit number. As illustrated in FIG. 4, the rightmost bit of R3 is the least significant bit of the second 32-bit number. The leftmost bit of R0 is the most significant bit of the second 32-bit number.

The 32-bit result of the 32-bit addition operation is a 32-bit number that consists of four eight-bit values R3, R2, R1, R0. Operation of the 32-bit addition operation results in the original contents of R3, R2, R1 and R0 being overwritten with the 32-bit result.

FIG. 5 is a simplified diagram of four instructions stored in program memory. The program memory is a processor-readable media. When the instructions of FIG. 5 are executed, the extended precision (32-bit) addition operation of FIG. 4 is performed. The first instruction is an eight-bit add (ADD) operation. When the ADD instruction is executed, the value of the carry in bit is ignored. (The carry in bit is explained further below). The ADD instruction includes a first byte and a second byte. The first byte ("02") is the opcode for the ADD instruction. The second byte includes two nibbles. The nibble "3" indicates that the second operand for the ADD instruction is to be found in register 3 (R3). The nibble "7" indicates that the first operand for the ADD instruction is to be found in register 7 (R7).

FIG. 6 illustrates a sequence of consecutive eight-bit memory locations in data memory. (The data memory is also processor-readable media). Each of R0 through R7 is an eight-bit location. The addresses of the memory locations of FIG. 6 increase by one from top to bottom of the diagram. R7 therefore has the highest address. The first operand (R7) and the second operand (R3) for the initial instruction of FIG. 5 are therefore labeled in FIG. 6 with the "USED IN INITIAL ADD" label.

The second instruction in the example of FIG. 5 is the novel repeat (RPT) instruction. Advantageously, this instruction includes only a single byte. This byte ("F3") is the opcode of the RPT instruction. As explained above, the RPT instruction contains no explicit statement of the address of any operand. Rather, the addresses of the operands to be used in execution of the RPT instruction are determined from the addresses of the operands of the initial instruction. The entry in the fourth column of the upper row of FIG. 3 for the ADD instruction is "--,--". The address for the first operand (the "source" operand) of the next instruction performed due to the repeat instruction is therefore determined by decrementing the address of the first operand (in R7) of the initial instruction. The address of the second operand (the "destination" operand) of the next instruction performed due to the repeat instruction is therefore determined by decrementing the address of the second operand (in R3) of the initial instruction. The addresses of the two operands used in the second RPT instruction are therefore in R6 and R2. These two registers R6 and R2 are labeled in FIG. 6 with the "USED IN FIRST RPT" label.

In the example of FIG. 5, the third instruction is another one-byte RPT instruction. The addresses of the operands are therefore obtained by decrementing the addresses of the operands of the previous instruction. The previous instruction (the first RPT) instruction used operands R6 and R2. The second RPT instruction therefore uses operands R5 and R1. These two registers R5 and R1 are labeled in FIG. 6 with the "USED IN SECOND RPT" label.

In the example of FIG. 5, the fourth instruction is another one-byte RPT instruction. The addresses of the operands are therefore obtained by decrementing the addresses of the operands of the previous instruction. The previous instruction (the second RPT) instruction used operands R5 and R1. The third RPT instruction therefore uses operands R4 and R0. These two registers R4 and R0 are labeled in FIG. 6 with the "USED IN THIRD RPT" label. As seen in FIG. 5, the total number of bytes of program memory consumed is five bytes, as compared to the eight bytes of the prior art of FIG. 2.

An INCREMENT operation is listed in the table of FIG. 3. A two-byte instruction specifies the opcode for the INC instruction as well as a designation of an eight-bit memory location. The memory location stores the eight-bit value to be incremented. The INCREMENT instruction takes only one operand. Where the one-byte RPT instruction follows the two-byte INCREMENT instruction, it is assumed that the value being incremented by the RPT instruction is a sixteen-bit value. The less significant byte is in the memory location pointed to by the prior INC instruction. The more significant byte, although not explicitly stated by the RPT instruction, is assumed to be the value stored in the next Lotanr memory location. When the RPT instruction is executed, the more significant byte is incremented only if the less significant byte rolled over (as a result of the previous instruction) from "11111111" to "00000000". The "Z" in the next instruction column indicates that the more significant byte of the operand is incremented only if the less significant byte rolled over to "00000000". The "--" in the fourth column indicates that the address of the more significant byte is found by decrementing the address of the operand pointed to by the prior INC instruction.

A DECREMENT operation is listed in the table of FIG. 3. The DECREMENT operation is the inverse of the INCREMENT operation. If the one-byte RPT instruction follows the two-byte DEC instruction, then the more significant byte of the operand is not explicitly stated, but rather is assumed to be the value stored in the memory location that is one lower in address with respect to the memory location of the less significant byte of the operand. When the RPT instruction is executed, the value of the more significant byte is decremented only if the value of the less significant byte was just decremented to "11111111". The "Z" in the next instruction column indicates that the more significant byte of the operand is decremented only if the less significant byte of the operand rolled over to "11111111".

A SHIFT RIGHT LOGICAL operation is listed in the table of FIG. 3. The SRL instruction is a two-byte instruction that sets for the opcode as well as a designation of a memory location. The SRL instruction operates on the content of the memory location, and shifts all the bits of the memory location to the right. A zero value is shifted into the leftmost position of the memory location. The value from the rightmost position of the memory location is shifted out into the carry bit. If the one-byte RPT instruction follows the SRL instruction, then the rotate right through carry (RRC) operation is performed. The memory location operated upon is not specified by the RPT instruction, but rather as indicated by the "++" in the fourth column of FIG. 3 is determined being incrementing the address of the designated memory location of the prior instruction. The value of the memory location operates upon by the RRC operation is shifted to the right. The value shifted into the leftmost bit is the value previously stored in the carry bit by the prior instruction. The value shifted out of the rightmost bit is loaded into the carry bit.

A SHIFT RIGHT ARITHMETIC operation is listed in the table of FIG. 3. The shift right arithmetic operation is similar to the shift right logical operation, except that it duplicates the sign bit and shifts it in from the left into the memory location designated by the two-byte SRA instruction. The sign bit is a bit in the status register. The RRC operation performed due to a following RPT instruction is the same as described above in connection with the SRL operation.

A PUSH operation is listed in the table of FIG. 3. The PUSH instruction is a two-byte instruction that includes the PUSH opcode as well as a designation of a memory location. The PUSH instruction transfers a byte from the designated memory location to a memory location identified by the stack pointer minus one. The stack pointer is stored in a predetermined special purpose location (for example, location FF) in the data memory. When the PUSH instruction is executed, the stack pointer is obtained, and is decremented. The new value of the stack pointer is then used as the write destination address. If the one-byte RPT instruction follows the PUSH instruction, then the push operation is repeated but the designation of the memory location that stores the value to be pushed is not explicitly given in the RPT instruction, but rather (as indicated by the "--" in the fourth column of the table of FIG. 3) the memory location that stores the value to be pushed is determined by decrementing the memory location from the prior PUSH instruction. Accordingly, executing a string of RPT instructions following a PUSH instruction causes a group of values to pushed, where the values are found at successively lower and lower memory locations. The first of the memory locations is the memory location identified by the initial two-byte PUSH instruction.

A POP operation is listed in the table of FIG. 3. The POP instruction is the inverse of the PUSH instruction. The POP instruction is a two-byte instruction that includes the opcode and a designation of a memory location where the popped value is to be written. Executing the POP operation causes the stack to be popped, and causes the popped value to be written to the memory location designated in the POP instruction. If the one-byte RPT instruction follows the POP instruction, then the pop operation is repeated, but the designation of the location where the popped value is to be written is not explicitly given in the RPT instruction, but rather (as indicated by the "++" in the fourth column of the table of FIG. 3) the location where the popped value is to be written is determined by incrementing the location where the prior popped value was written. Accordingly, executing a string of RPT instructions following a POP instruction causes a group of values to be popped and written into memory locations, where the values are written into higher and higher memory locations. The first memory location is the memory location identified by the initial two-byte POP instruction.

FIG. 7 illustrates an example where the RPT instruction is executed in a tight loop so that a block of sixteen contiguous bytes is transferred from a first block of memory (starting at B00H) to a second block of memory (starting at D00H). The first LD instruction loads register R0 with one less than the number of bytes to move. In the example, sixteen bytes are to be moved. A value of fifteen is therefore loaded into register R0. Next, the initial LDX instruction is performed to transfer the first byte from the first byte of the first block at B00H to the first byte of the second block at D00H. The initial instruction LDX consumes five bytes. Next, the RPT insatruction is executed. Next instruction logic 108 determines that execution of the RPT instruction shall cause the LDX operation to be performed. The source and destinations are incremented automatically so that the second byte (B0LH) from the first block is moved to the second byte (D0LH) of the second block. Next, the DJNZ (decrement and jump on non-zero) instruction decrements the value in R0 and jumps to the label "LOOP" if the value in register R0 is a non-zero value. The value in R0 is therefore decremented to fourteen, and processing jumps back to the RPT instruction. This jump back process continues such that the RPT instruction is repeated over and over until the entire block of sixteen bytes has been moved. When register R0 is zero, then DJNZ does not cause the jump back to the RPT instruction. Process flow moves on to the instruction that follows the DJNZ instruction. Inclusion of the RPT instruction enables such a block move to be encoded using only ten bytes of program memory, where four-teen bytes are otherwise required.

Figure 8:
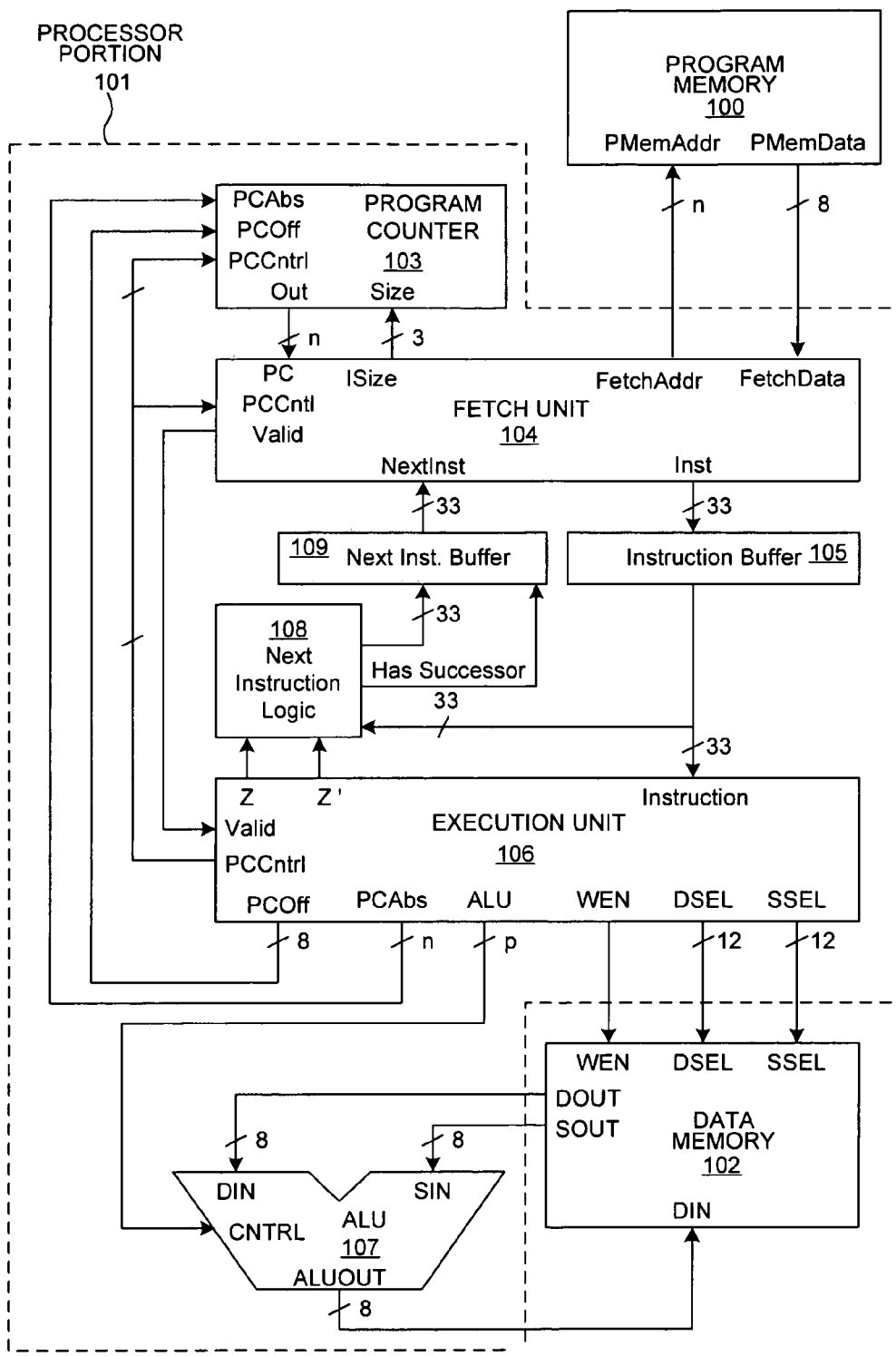
FIG. 8 is a simplified diagram of a part of a novel eight-bit microcontroller that carries out the novel repeat (RPT) instruction.

PROCESSOR ARCHITECTURE AND OPERATION: FIG. 8 is a simplified diagram of a portion of a novel eight-bit microcontroller integrated circuit that executes the novel repeat instruction (RPT) in accordance with one embodiment. The microcontroller integrated circuit includes an amount of program memory 100, a processor portion 101, and an amount of data memory 102. Processor portion 101 includes a program counter 103, a fetch unit 104, an instruction buffer 105, an execution unit 106, an 8-bit arithmetic logic unit (ALU) 107, next instruction logic 108, and a next instruction buffer 109.

The ALU 107 of FIG. 8 receives one or more 8-bit operand values from data memory 102 on 8-bit inputs DIN[0:7] and SIN[0:7], performs an arithmetic or logic operation on the 8-bit operand value or values, and outputs an 8-bit result on ALUOUT[0:7]. The 8-bit result is written back into data memory 102 via 8-bit input DIN[0:7]. The result (for example, the carry out value) is also used to update status flags in a status register (not shown). The operation to be performed by ALU 107 is determined by the P-bit value supplied onto the control inputs CNTRL[0:P−1] of the ALU 107. Operations can include arithmetic functions (addition, subtraction, multiplication, division), bitwise logical functions, shifts and rotates, bit-mask generation and testing operations.

Program counter 103 is a state machine that stores the address of the instruction currently being loaded, and computes the address of the next instruction to be loaded. It contains an n-bit wide register whose output OUT[0:N−1] is presented to fetch unit 104 as the program count (PC). It also contains combinatorial logic that computes the next program count value based on the current program count value, the instruction size (ISize), program counter control (PC Cntrl) signal values, a program counter offset value (PCOff), and a program counter absolute value (PCAbs). The PC Cntrl signals include several control signals including: a flush signal (FLUSH), a select signal (NextPC) that tells program counter 103 which of several sources (PCOff or PCAbs) to select as the source for the next PC, and an operation acknowledge signal (OpAck). Execution unit 106 asserts the flush signal FLUSH to cause the count in the program counter to be overwritten. Execution unit 106 asserts the OpAck signal when the execution unit 106 acknowledges and receives the current instruction in instruction buffer 105. Execution unit 106 deasserts the OpAck signal when the instruction in instruction buffer 105 has been executed and the contents of instruction buffer 105 are no longer needed. ISize is a three-bit output of fetch unit 104, and is valid when the instruction is acknowledged by the execution unit 106 by assertion of OpAck.

When execution unit 106 acknowledges the new contents of instruction buffer 105, the PC Cntrl signal OpAck is asserted and the PC is increased by the width of the current instruction, and a new fetch cycle begins. If the current instruction is one byte wide, then the PC is incremented by one. If the current instruction is two bytes wide, then the PC is incremented by two, and so on. Part or all of the next instruction may be fetched before execution of the current instruction is complete.

If the current instruction is a branch instruction and the branch is taken, then the PC is updated directly and the fetch cycle is restarted. Program counter 103 contains logic to allow the PC to be updated in this way.

Fetch unit 104 controls the loading of successive bytes of an instruction into instruction buffer 105. This is done by latching data from the program memory data bus (PMemData), one by one, into 8-bit portions of instruction buffer 105. The first byte is loaded into the Opcode portion of instruction buffer 105.

Figure 9:
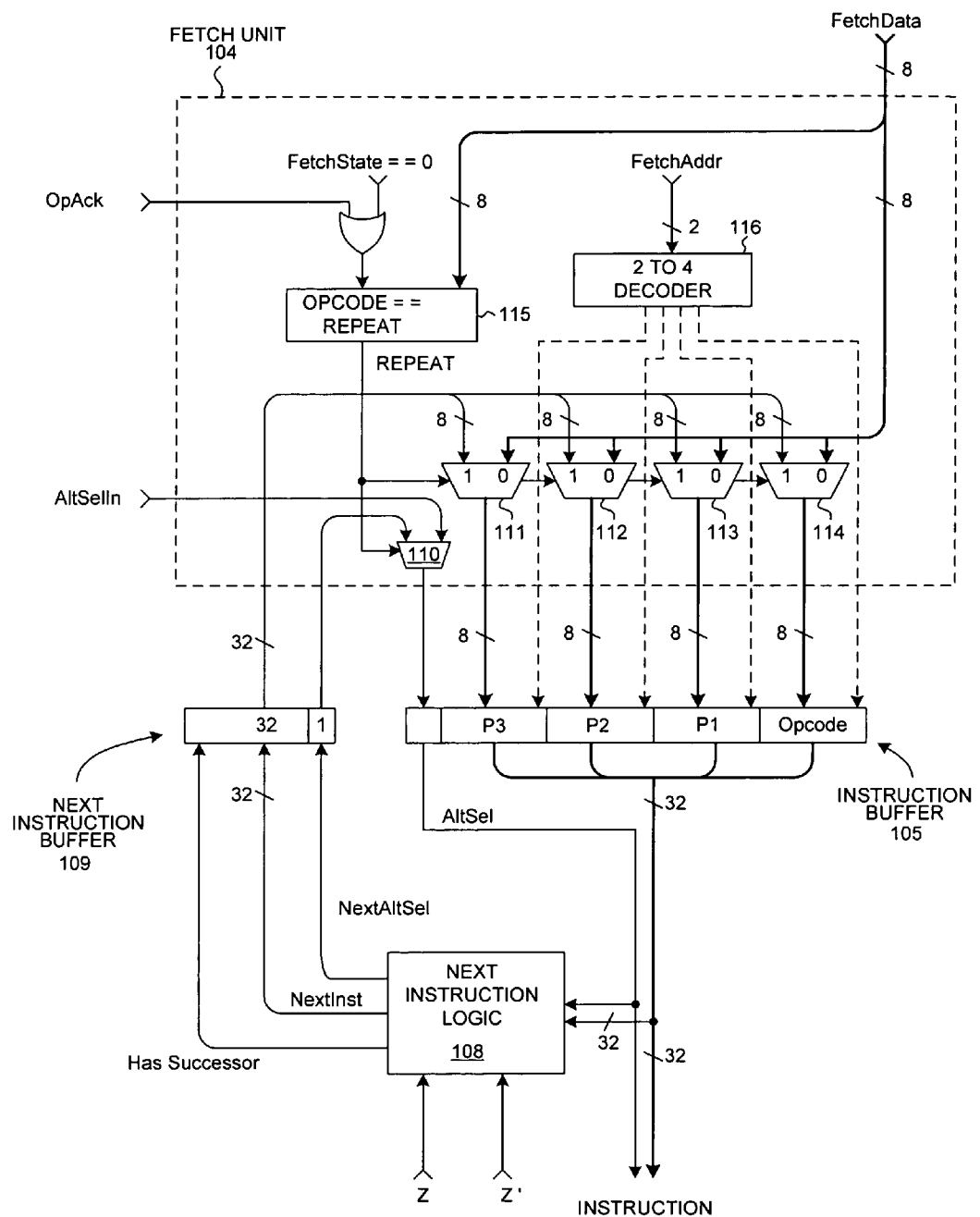
FIG. 9 is a more detailed diagram of the microcontroller of FIG. 8.

FIG. 9 is a more detailed diagram. The first byte (Opcode) of instruction buffer 105 is used by fetch unit 104 to determine the number of additional bytes to fetch (a number from zero to three). These additional bytes, once they are loaded into instruction buffer 105 one byte at a time, are labeled P1, P2 and P3 as seen in FIG. 9. Fetch unit 104 includes a state machine (not shown), multiplexers 110-114, a repeat opcode detect block 115, and a decoder 116. Fetch unit 104 combines the current PC value with an internal address increment value (FAddInc), and presents this sum on the program memory address bus (PMemAddr)(see FIG. 8). Combinatorial logic within fetch unit 104 determines when the correct number of bytes have been loaded, and thus when the contents of the instruction buffer 105 are valid. When the contents of the instruction buffer 105 are valid, then fetch unit 104 asserts the signal VALID (see FIG. 8) to execution unit 106. When fetch unit 104 asserts the VALID signal indicating that an instruction being held in instruction buffer 105 is ready for execution, execution unit 106 retrieves the complete instruction from instruction buffer 105 and executes the instruction.

Within execution unit 106, a state machine determines when the information in instruction buffer 105 is no longer needed (i.e., may be overwritten on the next rising edge of the system clock). When that is true, then the PC Cntrl signal OpAck is deasserted. If the instruction being executed by execution unit 106 is to alter program flow, then execution unit 106 asserts signals to the fetch unit to control the source of the PC update. The two possible sources are the PCAbs and PCOff values (only one of which is valid). The NextPC control signal output from execution unit 106 (one of the PCCntrl signals) tells program counter 103 which of the two sources to use. Asserting the Flush signal (FLUSH) simultaneously with the OpAck signal (FLUSH and OpAck are two of the PCCntrl signals) causes fetch unit 104 to begin the next fetch cycle with the newly-updated PC.

Execution unit 106 uses operand addresses directly from instruction buffer 105 to select the source operand register (in data memory 102) and the destination operand register (in data memory 102) and to route their data to ALU inputs DIN and SIN, respectively. The destination operand address is also used to route the ALU output ALUOUT[0:7] back into the appropriate register in data memory 102. Based on information in the opcode, execution unit 106 also presents control inputs onto the control inputs CNTRL of ALU 107 to select which ALU function (if any) is to be performed.

After fetch unit 104 has fetched an opcode, fetch unit 104 is in fetch state zero. In this state, block 115 (see FIG. 9) asserts the REPEAT signal if the RPT opcode is detected on the FetchData bus. Assertion of the REPEAT signal causes the 33-bit output of next instruction logic 108 to be multiplexed by multiplexers 110-114 onto the inputs of instruction buffer 105.

Next instruction logic 108 is combinatorial logic that generates an image of the next instruction (NextInst) required to perform chained extended precision calculations in accordance with the table of FIG. 3. The next instruction (NextInst) is determined based on the instruction currently held in instruction buffer 105 and on the signal values Z and Z'.

The signal Z is true if all of the bits of the result of the preceding instruction have become "00000000". The signal Z' is true if all of the bits of the result of the present instruction have become "00000000". Although the signals Z and Z' are illustrated in FIG. 8 coming out of execution unit 106, the signals Z and Z' are actually generated in ALU 107. The Z' signal is dynamic while the Z signal is stored in ALU 107 in a dedicated flip-flop.

On the next state transition of the fetch unit state machine, the next instruction values on the inputs of instruction buffer 105 are latched into instruction buffer 105. Fetch unit 104 asserts the VALID signal thereby informing execution unit 106 that the instruction in instruction buffer 105 is ready for execution. Fetch unit 104 remains in this state until execution unit 106 deasserts the OpAck signal and the next fetch cycle begins. In this way, if the RPT opcode is detected by opcode detect block 115, then the output of next instruction logic 108 is substituted for the RPT instruction. Execution of the RPT instruction effectively consumes zero clock cycles. More precisely, the RPT instruction requires one fetch cycle and zero execution cycles. The substituted instruction requires zero fetch cycles and its usual number of execution cycles.

Where there are so many instructions that they cannot all be uniquely encoded in the standard eight bits of opcode, then a second "page" of opcodes is provided. The opcodes on the second page are also eight-bit opcodes. When an eight-bit opcode is encountered, the processor checks to see if a special "1F" code is found immediately preceding the eight-bit opcode. If the special "1F" code is present, then the execution unit 106 determines that the opcode is from the second opcode page.

In the embodiment of FIGS. 8 and 9, the RPT instruction is usable with initial instructions from a first opcode page or from a second opcode page. If the special "1F" code is present, then this information is recorded by setting a single AltSel bit. Although the AltSel bit is illustrated in FIG. 9 as being a bit in the instruction buffer 105, the AltSel bit is actually produced by fetch unit 104 and is supplied to execution unit 106 via instruction buffer 105. The AltSel bit indicates whether the opcode in the instruction buffer 105 is for an instruction on the first opcode page or is for an instruction on the second opcode page. Within the instruction decoder in execution unit 106, the AltSelIn signal is latched into the AltFunc register after OpAck is asserted. Thus, the entire current instruction state is latched into the instruction decoder, and is available in the cycle following OpAck.

INTERRUPT HANDLING: Using the RPT instruction in a processor that services asynchronous interrupts introduces additional complexities. Because the RPT instruction depends upon the content of next instruction buffer 109, the content of next instruction buffer 109 must be preserved by an interrupt handler. The content of next instruction buffer 109 is stored before the first instruction having a valid successor is executed within the body of the interrupt handler. The content of next instruction buffer 109 is restored after the last such instruction has been executed.

By distinguishing between instructions having valid successors and those that do not, it becomes unnecessary to take into account the effects of the IRET instruction. In the preferred embodiment, special instructions are supplied to push and pop the next instruction buffer 109 to and from the execution stack. Executing the special PUSH instruction at the beginning of an interrupt handler and executing the special POP at the end of the interrupt handler is sufficient to preserve the state of the next instruction buffer 109.

To preserve backward capatability with a prior insturction set, the next instruction buffer 109 is not saved automatically when an interrupt occurs. Doing so would put an additional four bytes on the stack, effectively destroying any expectations regarding the contents of the stack following an interrupt. Programs that do not use the RPT instruction also need not save and restore the next instruction buffer 109. Thus, overall backward compatibility is preserved.

The special instructions are called PSHNI (PuSH Next Instruction) and POPNI (POP Next Instruction). As mentioned above, these instructions are used rarely (one pair in each nontrivial interrupt handler), so their opcodes are placed on the second opcode page. In one embodiment, the opcode for PSHNI is "CF" and the opcode for POPNI is "DF". If PSHNI and POPNI push and pop four bytes, respectively, then that still leaves the AltFunc bit without a place to be stored. Although it interferes with complete backward compatibility, the AltFunc bit is mapped in the embodiment of FIGS. 8 and 9 into one of the two user flags in the FLAGS register. The AltFunc bit is mapped into one of these two user flags because these flags are rarely used. These user flags are not used anywhere within the C compiler or run-time library for the previous processor.

When the RPT instruction is used within code that can be interrupted, then all interrupt routines that might interrupt that code must execute PSHNI on entry and POPNI on exit. This will consume an additional four bytes of stack for each level of interrupt allowed. For the C compiler, the implication is that the code generator will select either the new computational model (in which the RPT instruction is allowed and the last next instruction buffer 109 value is saved in every interrupt routine) or the old model (in which the RPT instruction is not used and the last value of the next instruction buffer 109 is not saved). Because the run-time library uses the RPT instruction if it is available, the two run-time libraries cannot be mixed. Old library code and library code written in backward-compatibility mode can be run on the modified processor of FIGS. 8 and 9 that supports the RPT instruction. However, code written for the modified processor of FIGS. 8 and 9 will generate an illegal instruction error when run on the older unmodified machine of FIG. 1 that does not support the RPT instruction.

Other embodiments: FIG. 10 is a diagram of another embodiment where a novel repeat instruction itself indicates a repeat count value. In the example of FIG. 10, the instruction mnemonic is RPT3. The one-byte instruction has an opcode of "F4". The RPT3 instruction causes the repeat operation is to be performed three times in sequence. A counter is provided in execution unit 106 that is decremented each time the repeat operation is performed. The RPT3 operation completes when the repeat operation has been performed the designated number of times. In the example of FIG. 10, a 32-bit addition operation is performed using just three bytes of program memory. The first two bytes are consumed by the initial two-byte ADD instruction. The third byte is consumed by the RPT3 instruction. The source and destination operand registers used by each successive repeat operation are the same the source and destination operand registers in the example of FIG. 5.

In another embodiment of the novel repeat instruction, the RPT instruction includes a repeat count value field. This field contains a number that determines a number of times the RPT instruction is executed in sequence. Execution procedes as in the case of the example of FIG. 10, except that the count value is obtained from the repeat count value field.

In another embodiment of the novel repeat instruction, an address of a register is provided as the second byte of the instruction. The register stores the number of times to repeat the repeat operation. Execution procedes as in the case of the example of FIG. 10, except that the count value is obtained from the designated register rather than from the opcode of a one-byte opcode.

FIG. 11 illustrates another embodiment of the novel repeat instruction wherein only some of the operands of the next instruction to be executed upon reading the RPT instruction are predetermined. The remaining operand or operands are supplied as further operands of the RPT instruction itself—thus forming a hybrid which lies between a fully-specified "initial" instruction and a repeat instruction which has no operands at all. This embodiment is particularly useful in specifying multiple bytes of an immediate (literal) operand. The operation to be performed and the addresses of the other operand(s) are inferred as in the preferred embodiment described above.

In another more general embodiment, sufficient information is provided in the opcode to determine the operation to be performed, but one or more of the operands are inferred from a preceding instruction. This embodiment relates to a RISC (Reduced Instruction Set Computer) architecture, in which the operation to be performed is determined from a fixed subset of the bits appearing in an instruction word. The remaining bits in the instruction word are used to determine the addressing mode for one or more operands. In some cases, such as immediate or indexed indirect addressing modes, part of the operand information is provided in additional instruction words following the initial one. In repetitions of that instruction in which the operands can be inferred, the necessity of specifying the additional instruction words is avoided by instead specifying a special addressing mode indicator. This special address mode indicator is interpreted by the processor to be the following directive: "use the same addressing mode as in the preceding instruction (or the preceding instruction of this type, or the preceding instruction of a similar type) and update it appropriately to perform the appropriate extended precision operation."

Although the present invention has been described in connection with certain specific embodiments for instructional purposes, the present invention is not limited thereto. The initial instruction can use direct addressing to identify an operand, and the RPT instruction can determine its corresponding operand based on the directly addressed operand of the initial instruction. The initial instruction can use an immediate (literal) data value as an operand, and the RPT instruction can determine its corresponding operand based on the initial literal value (for example, through sign- or zero-extension). The initial instruction can use indirect addressing to identify an operand, and the RPT instruction can determine its corresponding operand based on the indirectly addressed operand of the initial instruction. In particular, the repeat instruction may be especially effective in connection with an instruction set in which an index register holding the (indirect) address of an operand is incremented or decremented (as appropriate) as part of the execution of instructions which specify that index register as part of an indirect addressing mode.

In addition, in modern microcontroller designs, the distinction between a register and a memory location may lie entirely within the number of address bits used to select one versus the other. Aside from this distinction, registers and memory locations may in fact be coincident. Consequently, the term "address" may be used to specify either a register or a memory location without ascribing to it any particular number of bits. Accordingly, various modifications, adaptations, and combinations of various features of the described embodiments can be practiced without departing from the scope of the invention as set forth in the claims.

What is claimed is:

1. A processor circuit, comprising:
a memory comprising a plurality of memory locations, the memory storing a first instruction and a second instruction in consecutive memory locations, wherein the first instruction includes an opcode portion and a portion that holds an indicator of a first operand, and wherein the second instruction includes an opcode portion but does not include any portion for holding an indicator of an operand; and
a processor that executes the first instruction by performing a first operation using the first operand, wherein the first operand is stored at a first memory location in said memory identified by the indicator of the first operand of the first instruction, wherein the processor then executes the second instruction by performing a second operation, wherein the second operation is an operation of a type that is dependent upon the first instruction, wherein the second operation uses a second operand stored at a second memory location, wherein the second memory location is a memory location dependent upon the first memory location in said memory, and wherein the second operation is different than the first operation.

2. The processor circuit of claim 1, wherein the indicator of the operand is an address of the first memory location.

3. The processor circuit of claim 1, wherein the second memory location is a memory location adjacent to the first memory location in said memory.

4. The processor circuit of claim 1, wherein the indicator of the operand is an address of a third memory location which contains the address of the first memory location.

5. The processor circuit of claim 1, wherein the memory comprises a program memory and a data memory, the first and second instructions being stored in the program memory, the first and second operands being stored in the data memory.

6. The processor circuit of claim 1, wherein if the first operation is an add operation then the second operation is an add with carry operation, and wherein if the first operation is a compare operation then the second operation is a compare with carry operation.

7. The processor circuit of claim 1, wherein the first instruction is stored in two consecutive ones of the plurality of memory locations, and wherein the second instruction is stored in a single one of the plurality of memory locations.

8. The processor circuit of claim 1, wherein the memory stores a third instruction and a fourth instruction in consecutive memory locations, the third instruction includes an opcode portion and a portion that holds an indicator of a third operand, and wherein the fourth instruction includes an opcode portion but does not include any portion for holding an indicator of an operand, wherein the third instruction has an opcode that is different from the opcode of the first instruction, wherein the fourth instruction that has an opcode that is identical to the opcode of the second instruction, wherein the processor executes the fourth instruction by performing a fourth operation, wherein the fourth operation is an operation of a type that is dependent upon on the third instruction, and wherein the type of the fourth operation is different from the type of the second operation.

9. The processor circuit of claim 8, wherein the first operation is an add operation, the second operation is an add with carry operation, and wherein the fourth operation is not an add with carry operation.

10. The processor circuit of claim 1, wherein the processor determines the type of the second operation by supplying the opcode of the first instruction to a next instruction lookup logic circuit.

11. The processor circuit of claim 1, wherein the processor generates information as a result of carrying out the first operation, and wherein the information is used in carrying out the second operation.

12. The processor circuit of claim 1, wherein the processor generates carry information as a result of carrying out the first operation, and wherein the carry information is used in the second operation.

13. The processor circuit of claim 1, wherein the first operation is a move operation, and wherein the second operation is a move operation.

14. The processor circuit of claim 1, wherein the memory is part of a first integrated circuit, and wherein the processor is part of a second integrated circuit.

15. A processor-readable medium having a processor-readable instruction for performing the steps of:
selecting an operation to be performed based on an opcode of a previous instruction, wherein the previous instruction is stored in the processor-readable medium adjacent to the processor-readable instruction;

determining an address of a second operand to be used in performing the operation, wherein the address is determined by either incrementing or decrementing an address of a first operand used in performing the previous instruction, wherein whether the address is incremented or decremented depends on the opcode of the previous instruction; and performing the operation using the second operand, wherein the operation is different than an operation Performed by the previous instruction.

16. The processor-readable medium of claim 15, wherein the previous instruction has a first number of bits, wherein the processor-readable instruction has a second number of bits, and wherein the first number is bigger than the second number.

17. The processor-readable medium of claim 15, wherein the previous instruction is an addition instruction, and wherein the processor-readable instruction is an addition with carry instruction.

18. The processor circuit of claim 1, wherein the indicator of the first operand is a literal data value.

19. The processor circuit of claim 1, wherein the second operation is an operation of a type that is dependent upon the indicator of the first operand.

20. A processor circuit, comprising:

a memory comprising a plurality of memory locations, the memory storing a first instruction and a second instruction in consecutive memory locations, wherein the first instruction includes an opcode portion and a portion that holds an indicator of a first operand, and wherein the second instruction includes an opcode portion but does not include any portion for holding an indicator of an operand; and means for executing the first instruction by performing a first operation using the first operand, wherein the first operand is stored at a first memory location in said memory identified by the indicator of the first operand of the first instruction, wherein the means is also for executing the second instruction by performing a second operation, wherein the second operation is an operation of a type that is dependent upon on the first instruction, wherein the second operation uses a second operand stored at a second memory location, wherein the second memory location is a memory location adjacent to the first memory location in said memory, and wherein the second operation is different than the first operation.

21. The processor circuit of claim 20, wherein the second instruction includes an embedded repeat count value field.

22. The processor circuit of claim 20, wherein the second instruction identifies a memory location, the memory location containing a repeat count, the repeat count determining a number of times that the second instruction is executed.

23. The processor circuit of claim 20, wherein the means comprises an instruction buffer, next instruction logic, and a next instruction buffer.

24. The processor circuit of claim 20, wherein the indicator of the first operand is a literal data value.

25. The processor circuit of claim 20, wherein the second operation is an operation of a type that is dependent upon the indicator of the first operand.

* * * * *